(12) United States Patent
Kallinen et al.

(10) Patent No.: US 8,267,354 B2
(45) Date of Patent: Sep. 18, 2012

(54) FITTING

(75) Inventors: Risto Kallinen, Filton (GB); Christopher Payne, Filton (GB)

(73) Assignee: Airbus Operations Limited, Bristol (GB)

( * ) Notice: Subject to any disclaimer, the term of this patent is extended or adjusted under 35 U.S.C. 154(b) by 709 days.

(21) Appl. No.: 12/310,686

(22) PCT Filed: Sep. 18, 2007

(86) PCT No.: PCT/GB2007/050554
§ 371 (c)(1),
(2), (4) Date: Mar. 4, 2009

(87) PCT Pub. No.: WO2008/041019
PCT Pub. Date: Apr. 10, 2008

(65) Prior Publication Data
US 2009/0200425 A1    Aug. 13, 2009

(30) Foreign Application Priority Data
Oct. 3, 2006   (GB) ................................. 0619512.7

(51) Int. Cl.
*B64C 1/06* (2006.01)
(52) U.S. Cl. .................................................. 244/131
(58) Field of Classification Search ................ 428/105, 428/111, 126; 244/117 R, 123, 133, 131
See application file for complete search history.

(56) References Cited

U.S. PATENT DOCUMENTS

| | | | |
|---|---|---|---|
| 4,210,694 A * | 7/1980 | Fogg, III | 428/902 |
| 4,760,493 A | 7/1988 | Pearson | |
| 5,346,774 A * | 9/1994 | Burgess | 428/113 |
| 5,803,402 A * | 9/1998 | Krumweide et al. | 244/117 R |
| 5,981,023 A * | 11/1999 | Tozuka et al. | 428/105 |
| 6,073,405 A * | 6/2000 | Kasai et al. | 52/283 |
| 6,190,484 B1 * | 2/2001 | Appa | 244/123.7 |
| 6,415,496 B1 * | 7/2002 | Dominguez Casado et al. | 244/131 |
| 6,513,757 B1 | 2/2003 | Amaoka et al. | |
| 7,413,999 B2 * | 8/2008 | Goering | 428/111 |
| 2001/0002529 A1 | 6/2001 | Commins | |
| 2001/0051251 A1 | 12/2001 | Noda et al. | |

FOREIGN PATENT DOCUMENTS
EP      1 619 116     1/2006
WO  WO 2004/018183  3/2004

OTHER PUBLICATIONS

First Notification of Office Action dated Apr. 14, 2011 in Chinese Application No. 200780037270.8. and English translation.

(Continued)

*Primary Examiner* — Christopher P Ellis
(74) *Attorney, Agent, or Firm* — Nixon & Vanderhye P.C.

(57) ABSTRACT

A fitting for joining a first component to a second component, the fitting comprising a composite part and a reinforcement element. The composite part is formed from a composite material and comprises: a base; an end wall meeting the base at a first corner; and a side wall meeting the end wall at a second corner and the base at a third corner. The reinforcement element is shaped such that it can be fitted to the composite part and engage the end wall of the composite part, the first corner of the composite part; and the second corner of the composite part.

16 Claims, 8 Drawing Sheets

OTHER PUBLICATIONS

Office Action dated Jul. 15, 2011 in Russian Application No. 2009114318/11(019478) and English translation.
International Search Report for PCT/GB2007/050554, mailed Nov. 30, 2007.
Written Opinion of the International Searching Authority for PCT/GB2007/050554, mailed Nov. 30, 2007.
UK Search Report for GB Application No. 0619512.7, dated Jan. 24, 2007.

* cited by examiner

FITTING

This application is the U.S. national phase of International Application No. PCT/GB2007/050554, filed 18 Sep. 2007, which designated the U.S. and claims priority to Great Britain Application No. 0619512.7, filed 3 Oct. 2006, the entire contents of each of which are hereby incorporated by reference.

FIELD OF THE INVENTION

The present invention relates to a fitting for joining a first component such as a centre wing box to a second component such as a lateral wing box.

BACKGROUND OF THE INVENTION

A conventional tension corner fitting for joining a lateral wing box to a centre wing box is shown in FIG. 1. The fitting comprises a base; an end wall meeting the base at a first corner; and a side wall meeting the base at a second corner and the end wall at a third corner. The base and side wall are bolted to one of the wing boxes, and the end wall is bolted to the other.

Such fittings are conventionally formed from a metallic material. It would be desirable to form a fitting of this kind with a composite material, particularly when the centre wing box and/or lateral wing box are also formed from a composite material. This would remove galvanic corrosion and differential thermal expansion between the parts caused by the mismatch in materials. However the different properties of composite materials (in comparison with metals) makes it difficult to form a fitting of the required strength without having to increase the thickness of the walls of the fitting to unacceptable levels. In particular, it would be desirable to increase the thickness of the end wall relative to the base and side wall in order to minimise end wall bending, and to increase the thickness of the corners to minimise through-thickness failure at the corners. This variation in thickness is difficult to manufacture in a composite material, particularly a laminate.

SUMMARY OF THE INVENTION

A first aspect of the invention provides a fitting for joining a first component to a second component, the fitting comprising:
   a composite part formed from two or more layers of composite material, the composite part comprising:
      a base;
      an end wall meeting the base at a first corner; and
      a side wall meeting the end wall at a second corner and the base at a third corner; and
   a reinforcement element which is shaped such that it can be fitted to the composite part and engage the end wall of the composite part, the first corner of the composite part; and the second corner of the composite part.

The reinforcement element provides an alternative means of strengthening the end wall of the fitting, without requiring any variation in the thickness of the composite part. This makes an optimum configuration much easier to achieve. The reinforcement element also engages at least the first and second corners to provide further reinforcement and to counteract the tendency of the layers to come apart at the corners of the composite part.

The composite part typically further comprises a second side wall meeting the base at a fourth corner and the end wall at a fifth corner; and the reinforcement element is shaped such that it can be fitted to the composite part and engage the fifth corner of the composite part. This second side wall may be joined to a component in use (for instance where the fitting is a corner fitting) or may be for stiffening purposes only (for instance where the fitting is a channel fitting, or part of a crown fitting).

The composite part typically further comprises an upper wall meeting the side wall at a corner and the end wall at a corner; and the reinforcement element is shaped such that it can be fitted to the composite part and engage the corner of the composite part between the end wall and the upper wall. Where the composite part has two side walls, the upper wall typically adjoins both side walls at respective corners.

The edge of the upper wall opposite to the end wall may be formed with a recess to reduce weight and/or permit easy access to the reinforcement element.

Typically at least one of the side walls of the composite part has an edge which is inclined at an acute angle to the base to reduce weight and/or permit easy access to the reinforcement element.

The base and end wall of the composite part may be joined to the first and second components (when in use in a joint) by any means such as: co-bonding, co-curing, an adhesive layer, or a fastening element such as a bolt. Where a fastener is used, it may be a metal fastener, or may be formed from a composite material. Preferably the base and end wall (and optionally also the side wall) of the composite part each have one or more holes formed therein for receipt of a fastening element. Optionally the reinforcement element may also have one or more holes formed in it for receiving a fastening element.

The reinforcement element is typically formed from a different material to the composite part, most typically a non-composite material such as a metal.

One or more of the corners may be fitted with a filler which is engaged by the washer. In this case, the filler may have a planar surface which is engaged by a planar surface of the washer. Alternatively at least one of the corners of the composite part may be rounded and engaged by a rounded edge of the reinforcement element.

A further aspect of the invention provides a joint comprising:
   a first component;
   a second component; and
   one or more fittings according to the first aspect of the invention, each fitting having its base joined to the first component and its end wall joined to the second component.

The joint may be used in a variety of applications including for instance automotive or marine applications. However the joint is particularly suited for aerospace applications. For instance the first component may be part of a centre wing box of an aircraft, and the second component may be part of a lateral wing box of an aircraft.

A further aspect of the invention provides a method of manufacturing the fitting of the first aspect of the invention, the method comprising fitting the reinforcement element to the composite part such that it engages the end wall of the composite part, the first corner of the composite part; and the second corner of the composite part.

Preferably the method further comprises moulding the composite part in contact with the reinforcement element, in order to ensure intimate contact between the parts.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
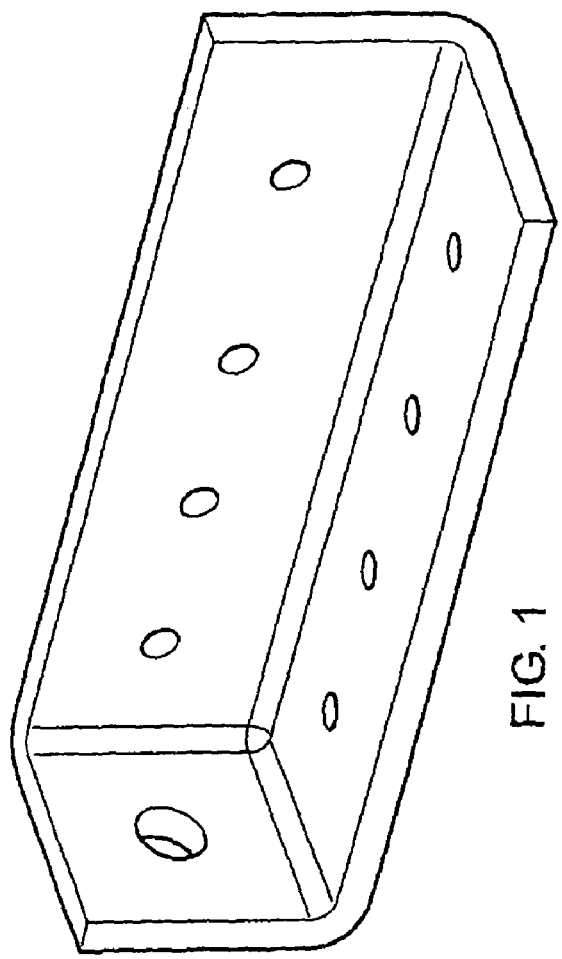
FIG. 1 is a perspective view of a conventional corner fitting.
Figure 2:
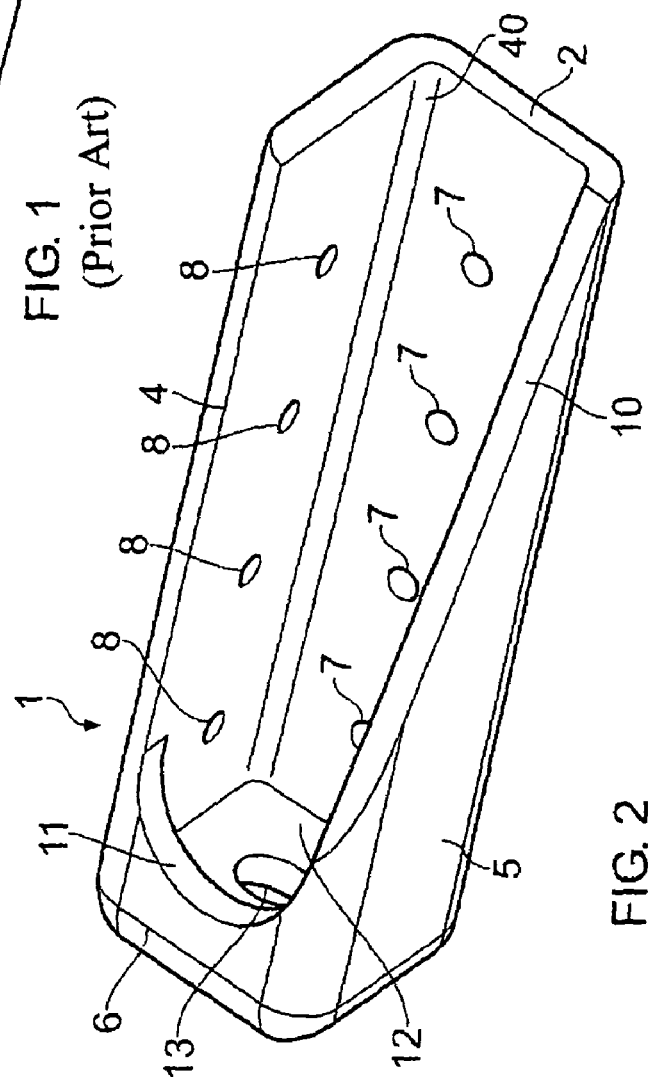
FIG. 2 is a perspective view of a corner fitting constituting a first embodiment of the invention.

Referring to FIGS. 2-4b, a corner fitting 1 comprises a composite part having a base 2, an end wall 3, a left side wall 4, a right side wall 5, and an upper wall 6 which meet at eight corners 40-47.

The composite part of the fitting 1 is manufactured from a composite material using either pre-impregnated tapes or fabrics, woven textiles or non-crimp fabrics, 3D woven preforms, short or long fibre moulding techniques, or dry fibre placement. The reinforcement fibres may be for example carbon fibre, and the matrix of the composite may be either thermosetting or thermoplastic.

In the case of a 3D woven preform, the preform (woven into the desired shape) is placed in a moulding cavity, and compressed by a set of mandrels to mould the part into its final shape. After the moulding step, the preform is also infused with matrix material. In the case of a thermosetting matrix, the matrix is cured by heating above its curing temperature during moulding.

In the case of 2D fabric, the flat fabric is cut and folded into the desired configuration, placed in a moulding cavity, and compressed by a set of mandrels to mould the part into its final shape. After the moulding step, the fabric is also infused with matrix material. In the case of a thermosetting matrix, the matrix is cured by heating above its curing temperature during moulding.

In the case of a short or long fibre moulding technique, a charge of matrix material containing randomly oriented short fibres is placed in a moulding cavity, heated and pressed to mould the charge into the desired shape.

The base 2 and left side wall 4 each have four bolt holes 7, 8 punched along their centre lines. The rear wall 3 has a single bolt hole 9 punched through its centre. Note that the number of bolt holes in the fitting may vary, depending on its configuration.

The right side wall 5 has no bolt holes and is provided for strengthening purposes only. Specifically it increases the capability of the fitting to carry loads transverse to the base 2. The right side wall 5 is cut away to minimise weight, leaving an angled edge 10.

The upper wall 6 also has no bolt holes and is provided for strengthening purposes only. Specifically it increases the capability of the fitting to carry loads transverse to the side walls 4,5. The upper wall 6 is cut away to minimise weight, leaving a concave edge 11.

The right side wall 5 and upper wall 6 are cut away sufficiently to permit access to bolts and nuts, and to minimise stress concentrations.

Figure 3:
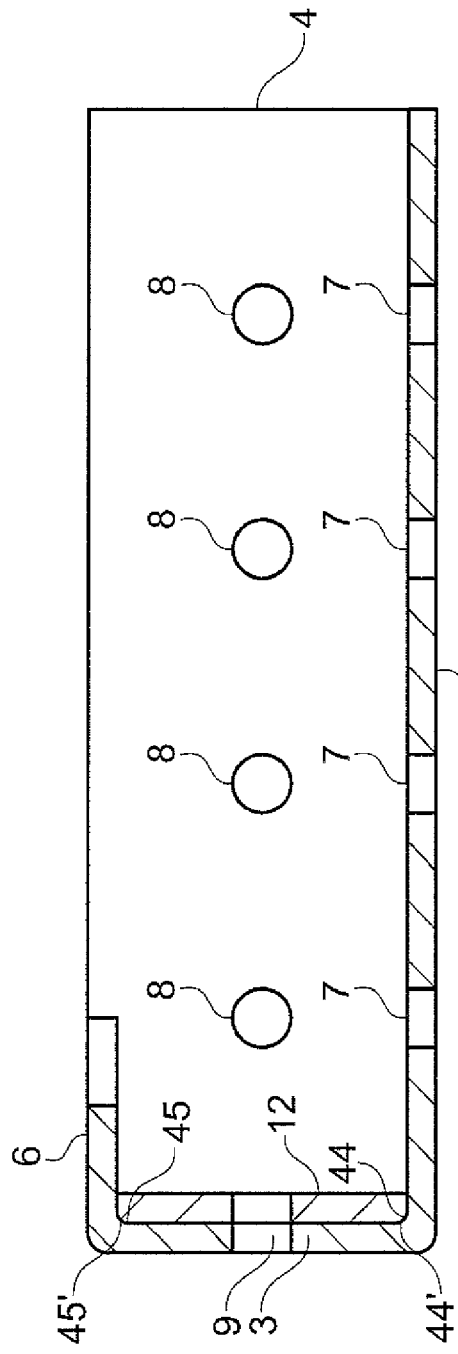
FIG. 3 is a longitudinal cross section through the centre of the fitting of FIG. 2.
Figure 4B:
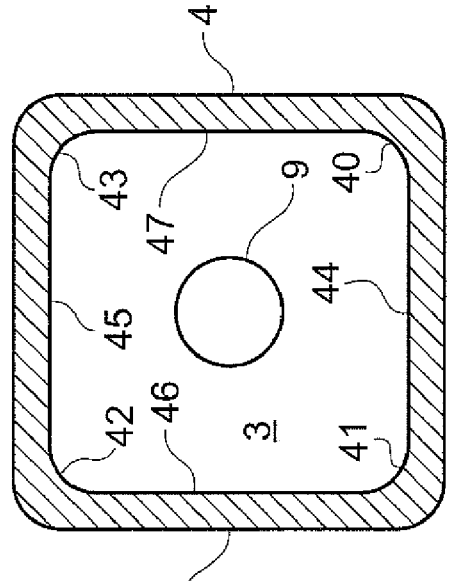
FIG. 4b is a transverse cross section through the fitting of FIG. 2, with the washer removed.
Figure 4A:
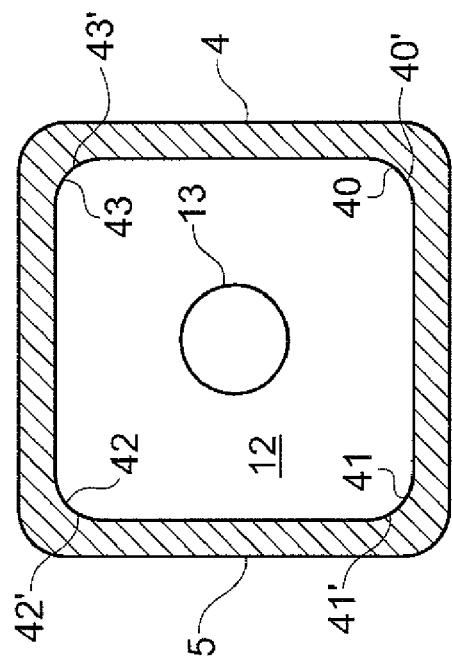
FIG. 4a is a transverse cross section through the fitting of FIG. 2.

A throat washer 12 with a bolt hole 13 through its centre is received as a push fit in the recess formed by the four walls 3-6 of the composite part in combination with the base 2. As shown in FIG. 3, the washer 12 has an end surface engaging the end wall 3; a base surface engaging the base 2; and an upper surface engaging the upper wall 6. As shown in FIG. 4a; the washer 12 also has a left side surface engaging the left side wall 4, and a right side surface engaging the right side wall 5. The washer has eight rounded edges, two of which are not shown, and six of which are labelled 40'-45' in FIGS. 3 and 4a. The eight rounded edges of the washer engage the eight rounded corners 40-47 of the composite part as shown in FIGS. 3 and 4a. The throat washer 12 may be a premachined aluminium, titanium or steel part.

Figure 5:
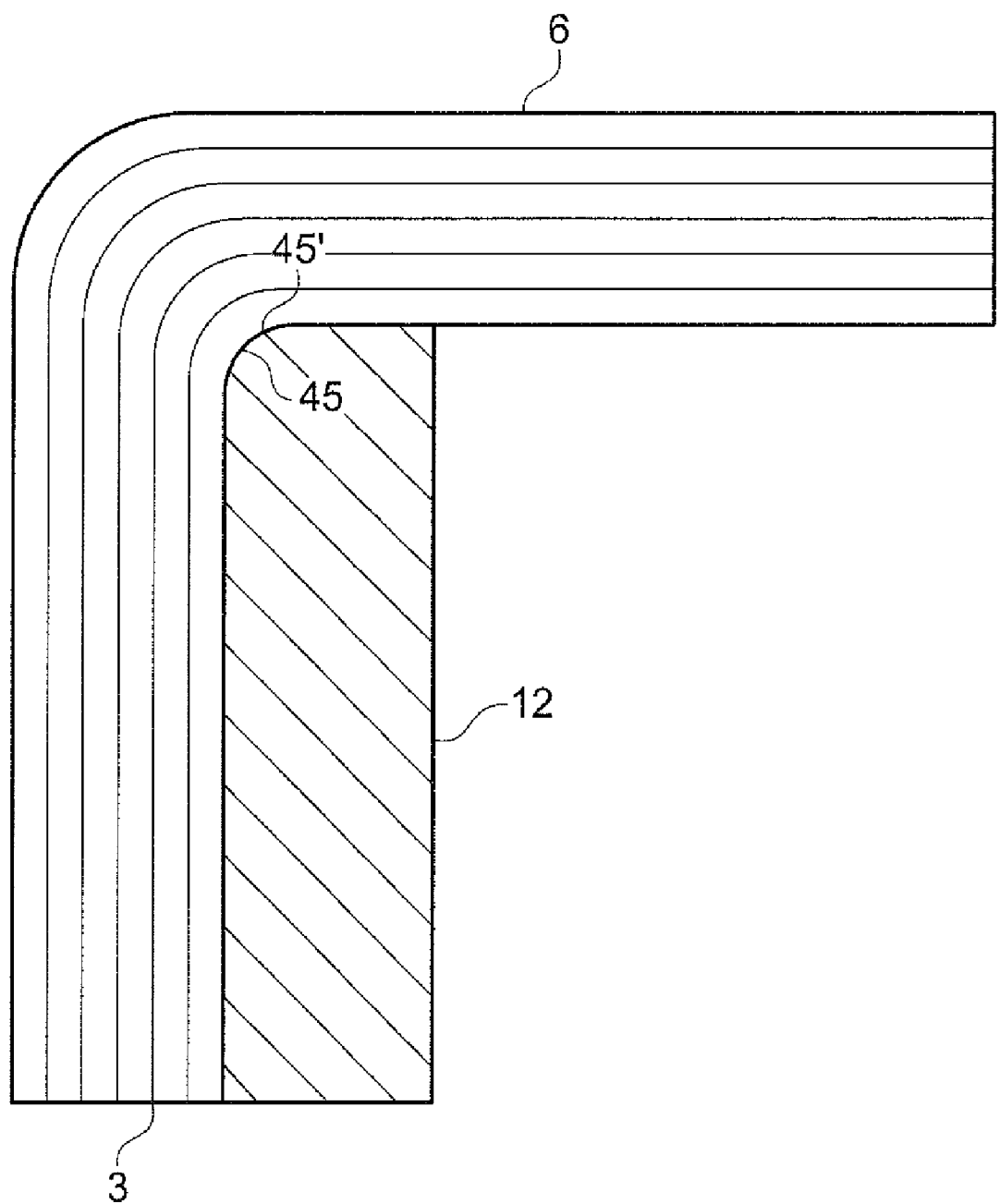
FIG. 5 is a longitudinal cross section showing one corner of the fitting of FIG. 1 in detail.

FIG. 5 shows the interface between one corner 45 of the composite part and an edge 45' of the washer 12. The interfaces at the other seven corners are similar. The composite part is formed from a series of plies. In the case of FIG. 5 six plies are shown, but in practice there may be a greater or lesser number of plies. Each ply is bent round the corner 45 with a radius of curvature centred on a common point. The radius of curvature of the inner ply at the corner is typically higher than 1 mm, most typically of the order of 5 mm. The radius of curvature for each ply may be constant to give a circular configuration, or the radius may vary, for instance to give an elliptical configuration.

In one of the failure modes of the fitting, the end wall bends and causes the corners to unfold. This tends to cause the plies to pull apart at the corner, potentially resulting in through-thickness failure. The washer 12 has an end surface which engages the end wall 3 and thus resists bending of the end wall 3. The edge 45' of the washer 12 is rounded with the same radius of curvature as the inner ply at the corner 45. Thus there is intimate engagement between the edge 45' and the corner 45 so that the washer 12 supports the corner and reduces the chance of such through-thickness failure.

The washer 12 may be placed in the moulding cavity in contact with the composite part during moulding, to ensure a tight fit and intimate contact with the composite part. Alternatively, intimate contact may be achieved by bonding the washer into place, with a filler occupying any gap between the washer and the composite part.

Figure 5A:
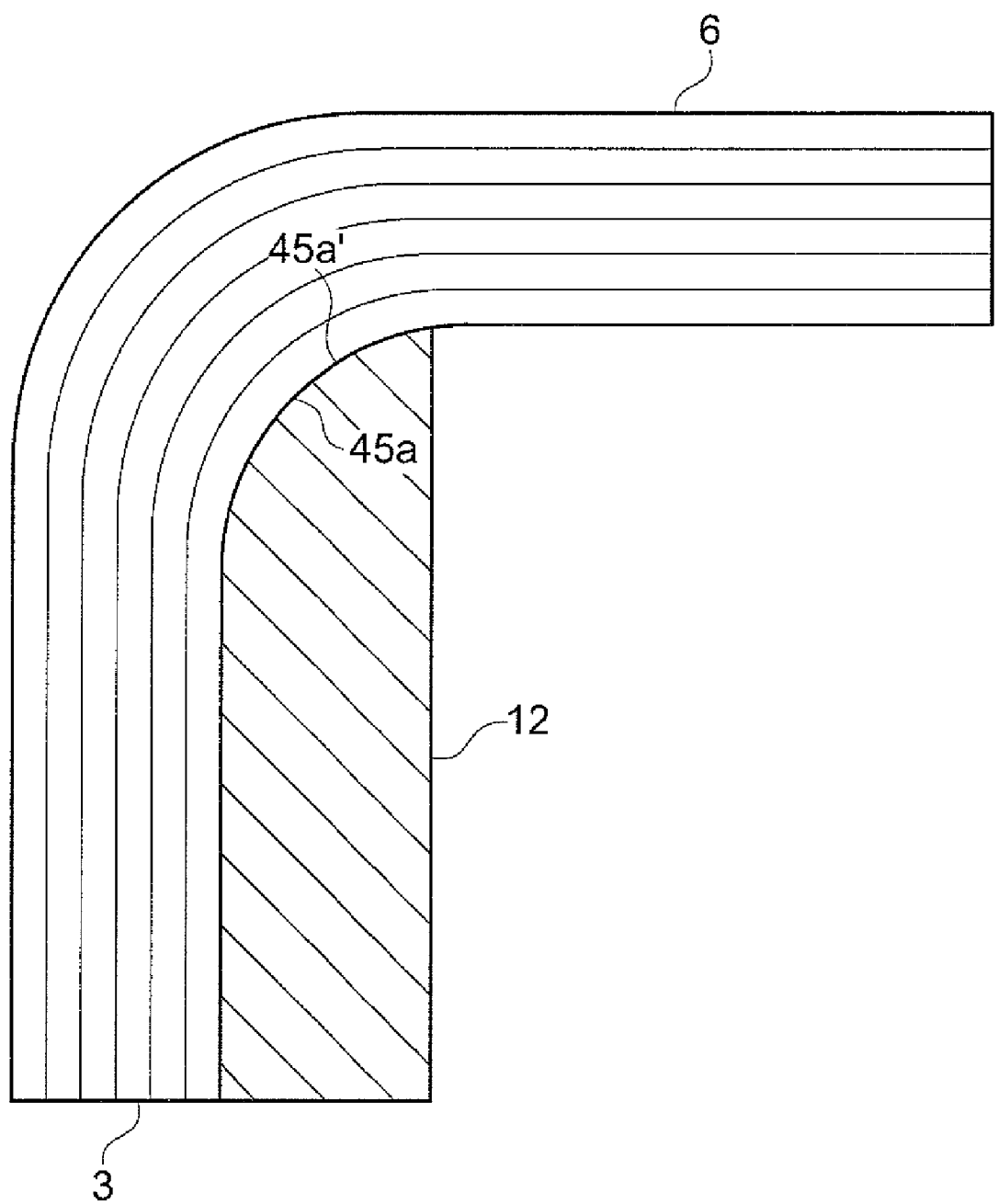
FIG. 5a is a longitudinal cross section showing a first alternative corner profile for the fitting.

A first alternative interface is shown in FIG. 5a. In this case the radius of curvature of the corner 45a and edge 45a' are greater than in FIG. 5, and the washer 12 has no planar upper surface engaging the upper wall 6.

Figure 5B:
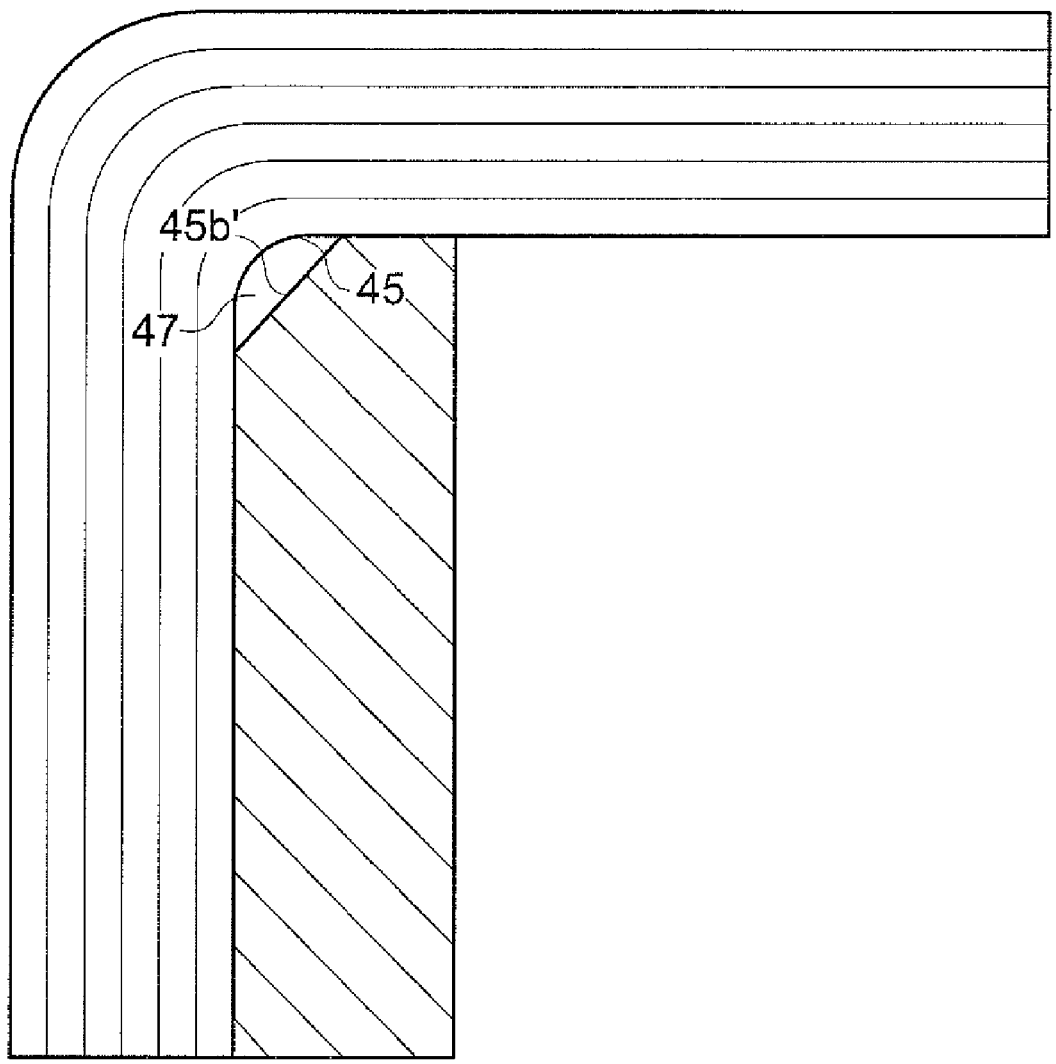
FIG. 5b is a longitudinal cross section showing a second alternative corner profile for the fitting.

A second alternative interface is shown in FIG. 5b. In this case the washer 12 has a chamfered edge 45b. The inner ply of the composite part has the same form at the corner as in FIG. 5. However in this case the gap between the inner ply and the chamfered edge 45b' of the washer is injected with a filler of matrix material 47.

Figure 6:
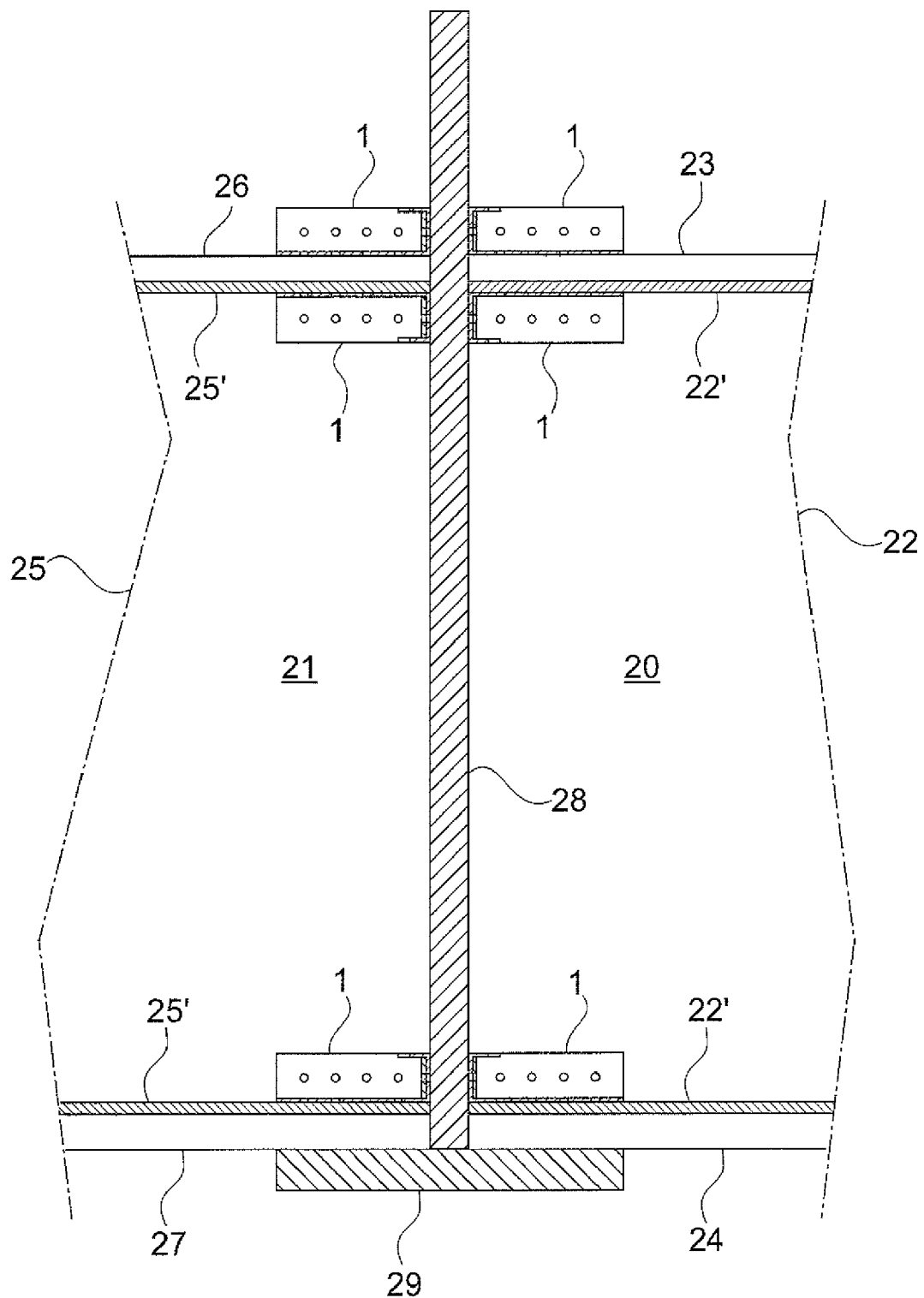
FIG. 6 is a schematic cross section showing a rear end of an aircraft wing root joint.

A root joint for an aircraft wing is shown in FIG. 6, incorporating six of the corner fittings 1 shown in FIG. 1. The fasteners connecting the various parts are not shown. The root joint shown in FIG. 6 provides a connection between a centre wing box 20 and a lateral wing box 21. The centre wing box 20 comprises a rear spar web 22 with a pair of rear spar flanges 22', an upper skin 23 and a lower skin 24. The lateral wing box 21 comprises a rear spar web 25 with a pair of rear spar flanges 25', an upper wing skin 26 and a lower wing skin 27. A rib 28 forms the interface between the centre wing box 20 and the lateral wing box 21 (or equivalently the rib 28 can be considered to be part of the centre wing box or the lateral wing box).

Six corner fittings 1 are shown in FIG. 6, connecting the wing boxes to opposite faces of the rib 28. The base of each corner fitting 1 is bolted to one of the skins 23,24,26,27 through the holes 7 in the base of the corner fitting and one of the spar flanges 22',25'. Each fitting 1 is also bolted to one of the spar webs 22,25 through the holes 8 in the side wall 4, and to the rib 28 through the hole 9 in the end wall 3. A splice plate 29 is also fitted below the lower wing skins 26, 27.

The root joint has a similar set of corner fittings 1 at the interface between front spars of the wing boxes (not shown).

Figure 7:
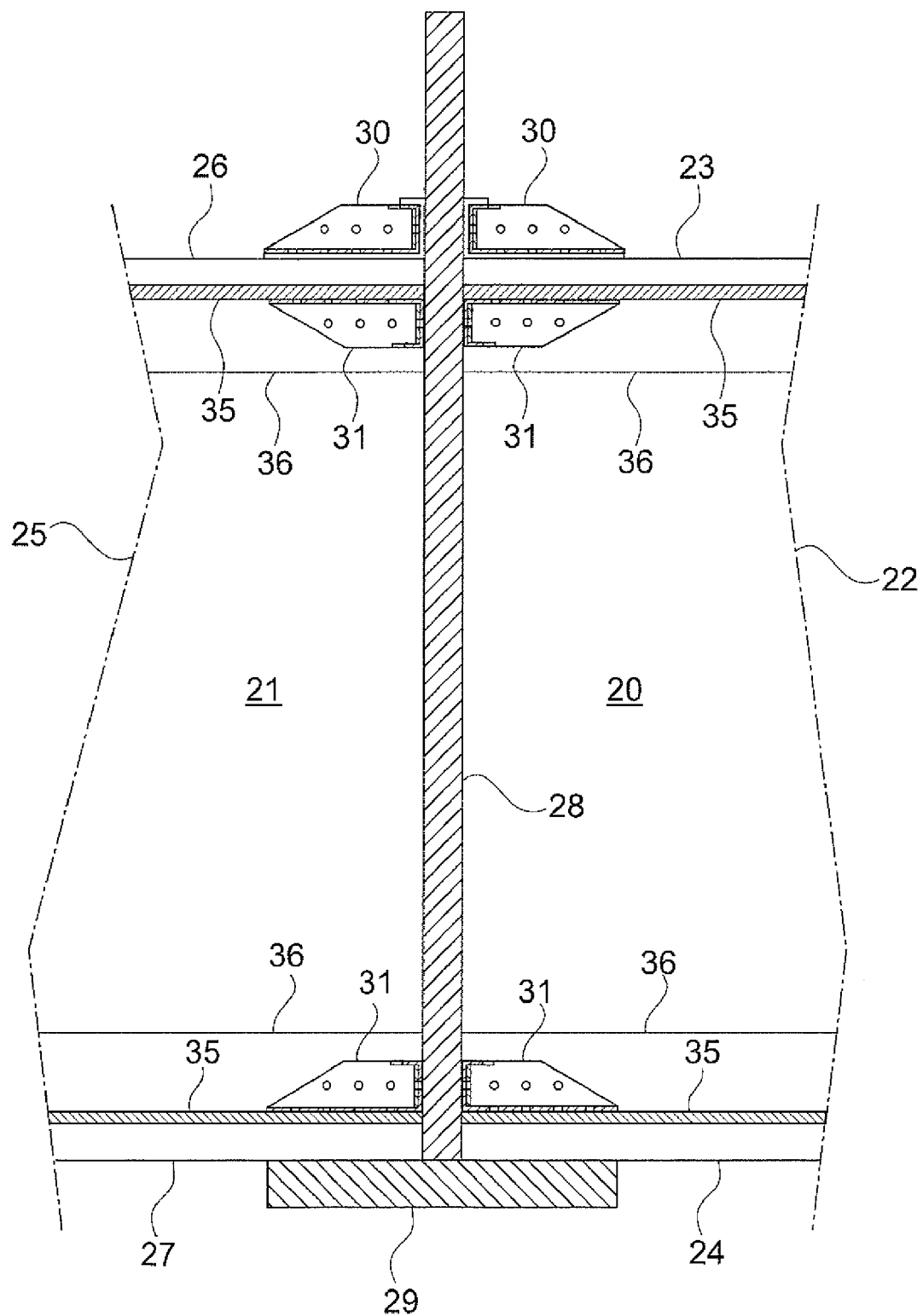
FIG. 7 is a schematic cross section showing a central part of the root joint of FIG. 6.

The cross section of FIG. 6 shows the corner fittings 1 which are provided at the rear end of the root joint. Crown fittings and channel fittings are also provided between the front and rear ends of the root joint, and a cross section through the middle of the root joint is shown in FIG. 7. A pair of crown fittings 30 and four channel fittings 31 are shown in FIG. 7.

FIG. 7 also show stringers which run spanwise along the inner faces of the skins 23,24,26,27. Each stringer has a stringer foot 35 and a stringer blade 36. Each stringer foot 35 is bolted to the base of a respective channel fitting 31 and the skin, and each stringer blade 36 extends between an adjacent pair of channel fittings.

Figure 8:
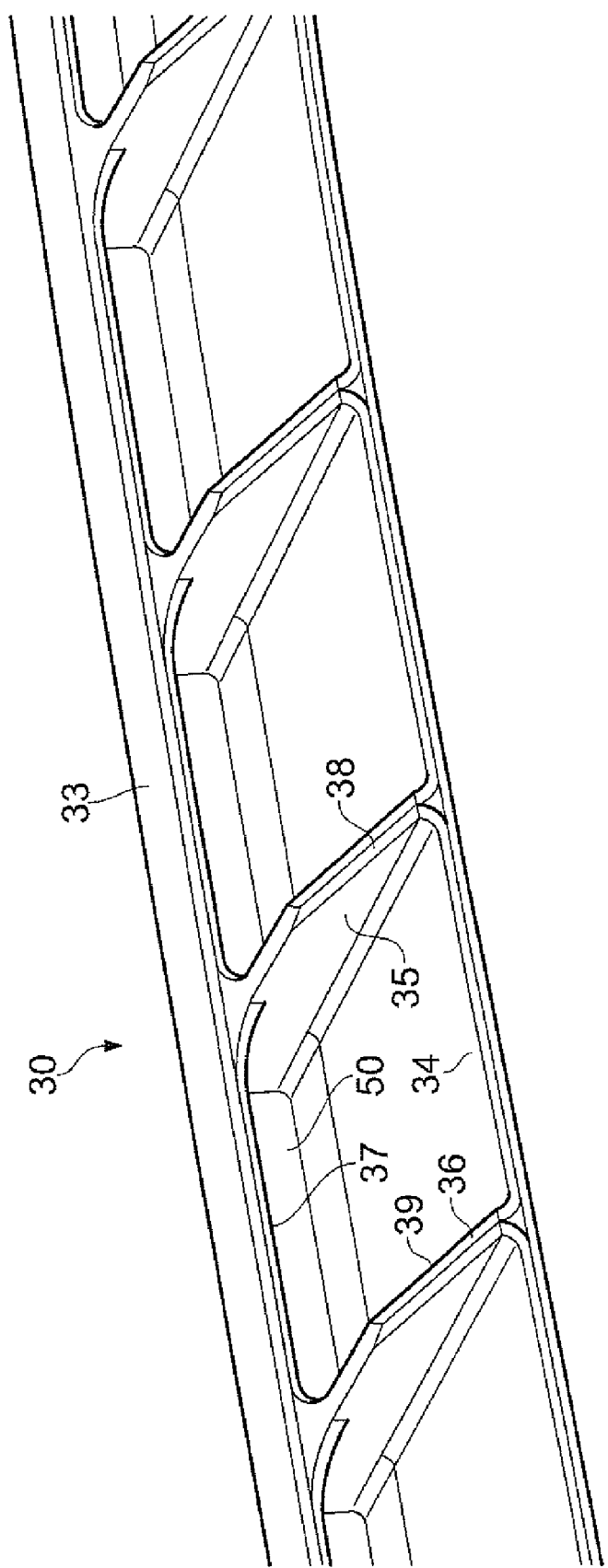
FIG. 8 is a perspective view of a crown fitting constituting a second embodiment of the invention.

FIG. 8 is a perspective view of one of the crown fittings 30. The crown fitting 30 comprises a row of channel fittings which are joined to each other by their adjacent side walls and wrapped in an enclosing wrap 33. Each channel fitting comprises a base 34, left and right side walls 35, 36, an end wall not shown in FIG. 8, and an upper wall 37. The end wall and the base each have bolt holes (not shown in FIG. 8) similar to the holes 7, 9 provided in the corner fitting of FIGS. 1 and 2. The left and right side walls 35, 36 are each cut away to provide angled edges 38, 39. A throat washer 50 is mounted in each channel fitting and has a bolt hole (not shown) similar to the bolt hole 13 provided in the corner fitting of FIGS. 1 and 2. Thus each channel fitting is similar in form to the corner fitting of FIGS. 1 and 2, except that the left side wall 36 is cut away as well as the right side wall 35.

Adjacent channel fittings in the crown fitting 30 are bonded to each other by an adhesive, and/or bolted to each other, and the assembly is held securely by the enclosing wrap 33.

As shown in FIG. 7, the base 34 of each channel fitting in the crown fitting 30 is bolted to the upper skin 23, 26, and the end wall is bolted to the rib 28.

The channel fittings 31 shown in FIG. 7 are of a similar construction to those which are joined together to form the crown fitting 30, except that the channel fittings 31 are not joined to adjacent channel fittings, and are not held together in an enclosing wrap to form a crown fitting. Otherwise, their construction and manner of fixing is identical.

Although the invention has been described above with reference to one or more preferred embodiments, it will be appreciated that various changes or modifications may be made without departing from the scope of the invention as defined in the appended claims.

What is claimed is:

1. A fitting for joining a first component to a second component, the fitting comprising:
    a composite part formed from at least two layers of composite material, the composite part comprising:
    a base;
    an end wall meeting the base at a first corner; and
    a side wall meeting the end wall at a second corner and the base at a third corner; and
    a separate reinforcement element configured to engage all of the end wall, the first corner part; and the second corner of the composite part.

2. The fitting of claim 1, wherein the composite part further comprises a second side wall meeting the base at a fourth corner and the end wall at a fifth corner; and the reinforcement element is configured to be fitted to and engage the fifth corner of the composite part.

3. The fitting of claim 1, wherein the composite part further comprises an upper wall meeting the end wall at a corner; and the reinforcement element is configured to be fitted to and engage the corner of the composite part between the end wall and the upper wall.

4. The fitting of claim 3 wherein the upper wall has an edge opposite to the end wall which is formed with a recess.

5. The fitting of claim 1 wherein at least one of the side walls of the composite part has an edge which is inclined at an acute angle to the base.

6. The fitting of claim 1 wherein the base and end wall of the composite part each have one or more holes formed therein for receipt of a fastening element.

7. The fitting of claim 1 wherein the reinforcement element has one or more holes formed therein for receipt of a fastening element.

8. The fitting of claim 1 wherein the reinforcement element is formed from a different material from the material of the composite part.

9. The fitting of claim 1 wherein the reinforcement element is formed from a non-composite material.

10. The fitting of claim 1 wherein the reinforcement element is formed from a metal.

11. The fitting of claim 1 wherein at least one of the corners of the composite part is rounded and is engaged by a rounded edge of the reinforcement element.

12. A method of manufacturing the fitting of claim 1, the method comprising fitting the reinforcement element to the composite part such that it engages the end wall of the composite part, the first corner of the composite part; and second corner of the composite part.

13. The method of claim 11 further comprising moulding the composite part in contact with the reinforcement element.

14. A joint comprising:
    a first component;
    a second component; and
    at least one fitting according to claim 1, said fitting having its base joined to the first component and its end wall joined to the second component.

15. The joint of claim 13 wherein the first component is part of a center wing box of an aircraft, and the second component is part of a lateral wing box of an aircraft.

16. An aircraft comprising a joint according to claim 13.

* * * * *